United States Patent Office 3,312,679
Patented Apr. 4, 1967

3,312,679
POLYMERIZATION PROCESS UTILIZING PEROXYDICARBONATE ESTER AND AMINOAROMATIC SULFONIC ACID SALT AS CATALYST
John C. Crano, Barberton, Ohio, assignor to Pittsburgh Plate Glass Company, Pittsburgh, Pa., a corporation of Pennsylvania
No Drawing. Filed Feb. 1, 1963, Ser. No. 255,661
19 Claims. (Cl. 260—93.5)

This invention relates generally to the polymerization of olefinically unsaturated, polymerizable compounds, notably compounds susceptible to free radical polymerization, derived from ethylene which contain the group:

$$>C=CH_2$$

In particular it relates to new redox-catalyst systems and novel methods useful for producing low-temperature polymerization of such compounds. These systems are devised from organic peroxydicarbonate polymerization catalysts and specific dialkylaminosulfonic acid salts as redox agents.

Previously it has been known that free radical polymerization may be carried out at reduced temperatures by employing free radical initiators which function at lower temperatures. Further, it has been recognized that certain free radical initiating catalysts, such as various organic peroxides could be employed in conjunction with specified redox systems to produce polymerization at reduced temperatures. Such a procedure is utilized in the production of "cold" rubber. It has also previously been known and described in U.S. Patent 2,464,062, that organic peroxydicarbonates such as diisopropyl peroxydicarbonate would initiate polymerization of unsaturated material such as styrene at 25° C. Benzoyl peroxide and related compounds used without activators generally require temperatures on the order of 50° C. to 80° C.

Polymerization at lower temperatures is desirable for a variety of reasons. For example, at lower temperatures more facile temperature control, faster polymerization because of more rapid heat removal, reduced discoloration, higher molecular weight, etc. may be obtained. Further, in the preparations of copolymers of substances such as butadiene and isoprene which contain a second olefinic bond, polymerization at the usual high temperatures leads to crosslinking and branch-chain formation.

Now it has been discovered that polymerization of unsaturated substances, notably ethylenically unsaturated polymerizable monomers such as ethylene and derivatives of ethylene which are monosubstituted or unsymmetrically disubstituted, viz., styrene, may be effectively polymerized at temperatures as low as 5° C., and even lower, by conducting the polymerization in the presence of an organic redox system with a catalyst which is an organic peroxydicarbonate, for example, diisopropyl peroxydicarbonate. As a result of this discovery polymerization yields are easily obtainable which previously could only be obtained at elevated temperatures and with high catalyst concentration.

By utilization of this discovery uniform polymers may be obtained. Frequently by low-temperature polymerization higher-melting polymers may be obtained from a monomer than is obtainable by higher temperature polymerization and often these higher-melting polymers are more stable and less readily decomposed by thermal means. Further, copolymers and homopolymers involving monomers like butadiene, isoprene, and chloroprene may be obtained by low-temperature polymerization with little or no crosslinking resulting from polymerization of the second double bond. This makes possible the preparation of fusible polymers containing olefinic unsaturation which may be utilized in subsequent crosslinking. Many other advantages may also be realized by the practice hereof, as will be apparent hereinafter.

In accordance herewith, polymerization of unsaturated polymerizable compounds, notably ethylene, monosubstituted ethylenes, and unsymmetrically disubstituted ethylene, is induced by proper use of small quantities of organic peroxydicarbonate, notably diisopropyl peroxydicarbonate. Thus, a combination of peroxydicarbonate ester and dialkylaminoaromatic sulfonic acid salt is used in liquid phase polymerization of ethylenically unsaturated monomers, ideally in a heterogeneous aqueous polymerization medium. In such aqueous polymerization medium, a solution of peroxydicarbonate in liquid monomer is agitated with an aqueous solution to distribute the organic liquid in the aqueous medium containing an emulsifying agent and a water-soluble alkali or alkaline earth metal salt of dialkylaminoaromatic sulfonic acid redox agent, whereby to effect polymerization of the ethylenically unsaturated monomer at reduced temperature in an emulsion or dispersion.

The unsaturated materials which may be polymerized by the practice of this invention are ethylenically unsaturated compounds, more specifically ethylene and monosubstituted and unsymmetrically disubstituted ethylenes containing up to 20 carbon atoms. These compounds include esters, nitriles and organic halogen compounds which are olefinically unsaturated compounds of both aromatic and aliphatic types. Heterocyclic compounds, viz., vinylpyrrolidine which contain ethylenic unsaturation in a side chain are also included. By way of illustration, vinyl esters such as vinyl acetate, vinyl propionate, vinyl butyrate, vinyl isobutyrate, and other vinyl esters containing as many as 18 carbon atoms in the acid moiety, may be polymerized in accordance herewith.

Other vinyl derivatives such as vinyl chloride, vinyl fluoride, styrene, nuclear substituted styrenes including o-methyl, m-methyl, p-methyl styrene, divinylbenzene, and other related compounds may also be polymerized in accordance herewith. Vinylidine derivatives, viz., vinylidene chloride and 1,1-dicyanoethylene respond to this polymerization also.

The acrylates respond particularly well to the techniques disclosed herein and the invention extends to include acrylates and methacrylates containing up to 16 carbon atoms in the alcohol moiety. By way of illustration, methyl methacrylate, ethyl acrylate, propyl acrylate, butyl acrylate, isobutyl acrylate, decyl acrylate, dodecyl methacrylate, and other related compounds respond to treatment set forth herein.

Other materials susceptible to the practice hereof include: acrylonitrile, methacrylonitrile, certain allyl esters, viz., the bisallyl biscarbonate ester of diethylene glycol, etc., and many related compounds and certain propylene derivatives, such as isopropenyl bromide, chloride and acetate.

Copolymers of the aforementioned unsaturated materials may be obtained. Among the more important copolymers which may be prepared in accordance herewith are: copolymers of butadiene, acrylonitrile, isoprene, vinyl acetate, vinylidene chloride, methylacrylate, and divinylbenzene with styrene, chloroprene, and one another. Copolymers of butadiene with styrene, butadiene with acrylonitrile, butadiene with chloroprene, isoprene with styrene, vinyl acetate with vinylidene chloride, chloroprene with acrylonitrile, styrene with methyl acrylate, and styrene with divinylbenzene, are examples of specific copolymers which may be prepared pursuant to this invention. Terpolymers prepared in accordance herewith are often of special utility, such as those derived from butadiene, acrylonitrile, styrene mixtures and other mixtures wherein vinyl acetate, isoprene, or methyl methacrylate may be components of the terpolymers.

Useful emulsifying agents may be nonionic, cationic, or anionic, as well as mixtures thereof. Mixtures of emulsifying agents often produce enhanced results. It is preferred to use a mixture of nonionic emulsifying agent. Examples of suitable emulsifying agents which may be employed herein include the following, but it is not intended to exclude many similar emulsifying agents which are not disclosed herein, as well as mixtures of emulsifying agents:

*Anionic.*—sodium lauryl sulfate (Duponol ME), sodium alkylnapthalenesulfonate (Nekal BX–78), sodium salt of sulfate alkylphenoxypolyoxyethylene (Alipol Co–433), complex organic phosphate (Gafac RE–610).

*Nonionic.* — nonylphenoxpoly (ethyleneoxy)ethanols (Igepal Co–630 and Co–880), polyoxyethylated fatty alcohol (Emulphor ON–870).

*Amphoteric.*—hydroxylated phosphatides of soybean oil complex (hydroxy lecithin).

Organic peroxydicarbonates useful in this invention have the general structure:

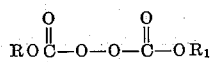

where R and $R_1$ are organic radicals derived from alcohols or substituted alcohols bearing inert groups such as halogen, nitro, carbalkyloxy, ether, and carbonyl and which groups are linked through oxygen atoms to the carbonyl radical. The dialkyl peroxydicarbonate esters (wherein R and $R_1$ are alkyl groups) are particularly effective. These compounds form free radicals useful for the initiation of emulsion polymerization at temperatures generally lower than other classes of peroxy compounds, such as benzoyl peroxide and lauroyl peroxide. In accordance herewith peroxydicarbonate compounds initiate free radical polymerization at still lower temperatures when employed in the cooperative presence of redox salt compounds disclosed herein. Among the organic peroxydicarbonates suitable for use herein are the peroxydicarbonates of monohydric alcohol, containing less than about 18 carbon atoms. Especially suitable for use for catalyzing polymerization in conjunction with redox agents at lower temperatures are the alkyl peroxydicarbonates derived from alcohols containing up to about 18 carbon atoms such as the methyl, ethyl, isopropyl, n-propyl, isobutyl, n-butyl, lauryl, amyl, and hexyl peroxydicarbonates, and the corresponding aliphatic unsaturated peroxydicarbonates, such as the allyl, methallyl, crotyl, vinyl, propargyl, or 2-chloroallyl peroxydicarbonates. Araliphatic, heterocyclic, aromatic, and cycloaliphatic derivatives such as benzyl, cyclohexyl, tetrahydrofurfuryl or cinnamyl peroxydicarbonates also may be used according to this invention. Moreover, more complex peroxydicarbonates such as bis-(2-nitro-2-methylpropyl) peroxydicarbonate and the products derived by reaction of the chloroformates of monohydroxy acids or their esters (ethyl lactate, ethyl glycollate, ethyl salicylate, methyl lactate, etc.) with sodium peroxide, may be used as herein contemplated. Also contemplated are the polymeric peroxydicarbonates obtained by reacting ethylene glycol dichloroformate or diethylene glycol dichloroformate of other glycol or polyglycol with sodium peroxide and such other peroxydicarbonates as may be described or suggested in Patent 2,370,588.

The peroxydicarbonate esters are usually water-insoluble liquids but sometimes are white crystalline solids at room temperature. They are usually soluble in the polymerizable monomers at or below the temperature of polymerization. The percarbonate esters, and particularly the liquid esters, slowly decompose at normal room temperatures and may at slightly higher temperatures decompose spontaneously. Since the decomposition reaction is exothermic, the heat generated by slow decomposition at normal room temperature may cause an elevation of the temperature within the mass and induce rapid decomposition. Accordingly, the percarbonates should be refrigerated or otherwise stabilized prior to use. The stabilization may be effected by cooling to 0° C. or lower by suitable cooling medium, for example, solid carbon dioxide. The stabilization may be effected also by dissolving up to one percent of iodine in the liquid percarbonate and washing the iodine out just prior to the use.

Preferred redox agents as employed herein are the water-soluble alkali metal and alkaline earth metal sulfonates resulting from the neutralization of selected sulfonic acids with alkali metal hydroxide, or alkaline earth metal hydroxide. Any water-soluble salt of the selected sulfonic acid may be employed, even those resulting from substitution of oxides and hydroxides of metals from groups of the Periodic Table other than I and II. While effective for polymerization, such salts sometimes introduce other considerations, for example, manganese 4-dimethylaminobenzenesulfonate may lead to discolored products of polymerization. Obviously, when discoloration is undesirable a different salt is used. Therefore, the alkali and alkaline earth metal salts and especially sodium salts are preferred. Alkali metal hydroxides which may be employed for preparing these salts include: lithium hydroxide, sodium hydroxide, potassium hydroxide, rubidium hydroxide, cesium hydroxide. The sodium and potassium compounds are economically preferable. Alkaline earth metal hydroxides which may be employed for neutralizing the sulfonic acids are: barium hydroxide, calcium hydroxide, strontium hydroxide, magnesium hydroxide, and beryllium hydroxide. Of these the alkaline earth metal hydroxides of magnesium, calcium, strontium, and barium, are especially economically attractive.

The redox compounds for use herein may be prepared by known procedures. For example, 4-dimethylaminophenyl-$\beta$-ethanesulfonic acid may be prepared from 4-aminophenyl-$\beta$-ethanesulfonic acid by standard alkylation procedure. In turn, 4-aminophenyl-$\beta$-ethanesulfonic acid may be obtained by hydrogenation of 4-nitrophenyl-$\beta$-ethanesulfonic acid over palladium on carbon. The 4-nitrophenyl-$\beta$-ethanesulfonic acid may be readily obtained from 4-nitrophenyl-$\beta$-ethyl bromide by the procedure of U.S. Patent 2,913,451. The preparation of aralkylene bromides in general may be accomplished by the method of Clutterbuck and Cohen, J. Chem. Soc. 123, 2510. The initial alcohols for use in the method of Clutterbuck et al. are obtained readily by the method of J. B. Conant and W. R. Kirner, J. Am. Chem. Soc. 46, 240 (1924). These procedures are useful in obtaining many of the redox compounds employed herein.

The sulfonic acids suitable for use in the preparation of the redox compounds generally contain fewer than 30 carbon atoms but may also contain more and are the dialkylaminoaromatic derivatives of the sulfonic acids represented by the following formula:

$$R'R''N\text{---}X\text{---}(CH_2)_r\text{---}SO_3H$$

wherein: r may be a small whole number, zero through ten; R' and R'' may be selected from aliphatic groups containing up to 18 carbon atoms and typified by the groups: methyl, ethyl, propyl, isopropyl, butyl, isobutyl, t-butyl, secondary-butyl, hexyl, octyl, and may be the same or different; X may be selected from the following groups: o, m, p-phenylene, substituted o, m, p-phenylene

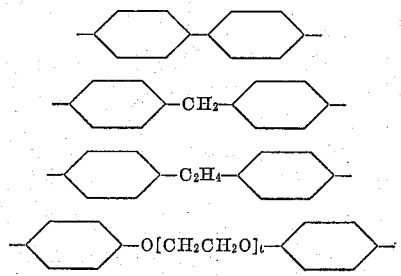

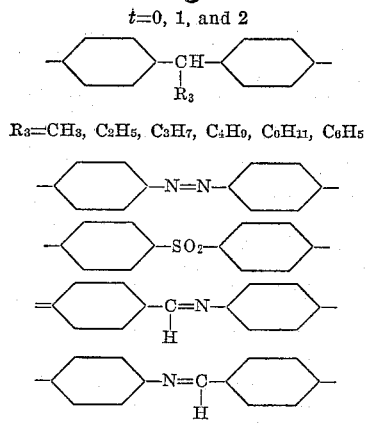

$t = 0, 1,$ and $2$ $R_3 = CH_3, C_2H_5, C_3H_7, C_4H_9, C_5H_{11}, C_6H_5$

Alkali metal salts and alkaline earth metal salts of the aforementioned sulfonic acids are reacted with the acid by dissolving the corresponding alkali metal hydroxide or alkaline earth metal hydroxide in water and agitating the resulting solution with a molecular equivalent of the desired sulfonic acid, employing sufficient water to result in a concentration of the soluble salt of from about 1 percent by weight of solution to saturation. The salt may then be isolated for subsequent utilization by redissolving in water to form an aqueous solution suitable for use in an emulsion polymerization. Alternatively, the salt solution may be employed directly in the emulsion polymerization without prior isolation.

In the practice of this invention a dialkylaminosulfonic acid salt, viz., sodium 3-dimethylaminobenzene sulfonate is dissolved in water containing emulsifying agent, such as nonylphenoxypoly(ethyleneoxy)ethanol (Igepal Co–630). This aqueous solution is cooled to 5° C. or other suitable temperature and is combined with an ethylenically unsaturated material such as described hereinbefore, and typified by styrene to which monomer has previously been added a small quantity, for example, 0.5 part by weight of dialkyl peroxydicarbonate, typically isopropyl peroxydicarbonate, per hundred parts of monomer. After agitation at 5° C. for a period of time, suitably for 4 hours, the polymerized emulsion resulting may be separated to recover polymer and unconverted monomer. The separation of polymerized emulsion may be accomplished by dilution with a solvent to cause stratification into organic phase and aqueous phase. Heptane may be employed for this purpose.

The temperature used in the practice hereof may be any temperature from —35° C to 100° C., although the vapor pressure of certain monomers would require that the reaction be carried out under pressure sufficient to maintain the monomer as a liquid at the chosen temperature. However, temperatures below approximately 0° C. require special apparatus for cooling and precaution against ice formation on the cooling coils must be taken. Hence, a nonparticipating water-soluble organic solvent, such as acetone or methanol, is required to be added when it is desired to conduct polymerization at temperatures below 0° C. At temperatures approaching the normal boiling point of the liquid medium, the reaction may become uncontrollably rapid when, by way of illustration, the emulsion polymerization herein disclosed is applied to styrene. The medium has a boiling point near 100° C. and utilization of such a high temperature with the herein disclosed redox-catalyst systems would result in a polymerization rate of very violent intensity. However, when it is desired to employ high temperatures in the utilization of these redox-catalyst systems, the polymerization may be conducted at a controllable rate by reducing the concentration of the redox agent. Temperatures such as those above 35° C. in general have a tendency to produce polymers lacking the improved properties obtained by polymerization at lower temperatures, such as 5° C. Thus, while it is feasible to employ the redox catalyst system disclosed herein at temperatures from —35° C. to 95° C., benefits are greatest with temperatures from approximately —20° C. to approximately 30° C.

The concentration of the various components utilized in the practice hereof may be varied over extremely wide ranges. The amount of aqueous phase employed may vary from a few percent by weight of the monomer phase to many times the weight of the monomer phase. However, the relationship of aqueous phase to organic phase is dependent upon the type of emulsion desired and the particular monomer which is being polymerized. Generally, from 50 parts of water per 100 parts by weight of monomer to 1,000 parts of water per 100 parts by weight of monomer is preferred. When it is desired to polymerize styrene, employing the technique herein described, a suitable ratio is 220 parts of water per 100 parts of monomer by weight. Increasing the quantity of water greatly requires an increase in the quantity of redox agent employed, whereas a decrease in the quantity of water often results in too rapid polymerization.

In preparation for polymerization, the selected peroxydicarbonate is dissolved in the monomer by stirring. The amount of peroxydicarbonate employed depends on the particular peroxydicarbonate selected. Generally, adequate initiation of polymerization may be obtained by dissolving 0.001 mole of peroxydicarbonate in the monomer per mole of monomer. For a monomer of molecular weight of about 100 and diisopropyl peroxydicarbonate this represents 0.2 weight percent of the monomer. When the particular peroxydicarbonate is diisopropyl peroxydicarbonate a suitable polymerization is initiated by employing as little as 0.02 percent or even less of diisopropyl peroxydicarbonate by weight of monomer. Utilization of more than 2.0 percent of diisopropyl peroxydicarbonate by weight of styrene results in an uncontrollably rapid polymerization at 5° C. Thus, it is preferred to employ from 0.02 to 2.0 percent diisopropyl peroxydicarbonate by weight of monomer. Many monomers are polymerized at preferred rates by the utilization of 0.5 percent diisopropyl peroxydicarbonate by weight of monomer.

The weight ratio of redox agent to peroxydicarbonate depends upon the particular redox agent and particular peroxydicarbonate selected, as well as upon the monomer and amount of aqueous phase. Thus, when polymerizing styrene with diisopropyl peroxydicarbonate, a preferred amount of sodium 4-dimethylaminobenzene sulfonate is approximately 1.1 grams in 220 grams of water per 100 grams of styrene monomer containing 0.47 gram of diisopropyl peroxydicarbonate. Thus, approximately 2 parts by weight of redox compound is preferred per part of peroxydicarbonate. In general, more than one part by weight of redox compound per part of peroxydicarbonate, but less than 250 parts by weight of redox compound per part of peroxydicarbonate is required. Ratios of redox compound to peroxydicarbonate outside of this range generally give rates of reaction which are too slow at the low ratio and which are too fact at the high ratio. Preferred ratios are generally within the range of 0.5 part by weight of redox compound per part peroxydicarbonate.

The amount of redox agent required is approximately proportional to the amount of peroxydicarbonate employed and may also vary within wide limits. When 220 parts of water per 100 parts of monomer are employed, the amount of redox agent may be selected from 0.05 part of redox agent per 100 parts of monomer by weight to as much as 5.0 parts of redox agent per 100 parts of monomer by weight. In the polymerization of styrene good results may be obtained by employing from 0.5 to 1.0 part of redox agent per 100 parts of monomer by weight.

The amount of emulsifier is selected in accordance with the condition of the emulsion obtained under reaction conditions. It is generally desirable to produce an emulsion of the monomer in the aqueous phase so that the solid polymer at completion of the conversion has the consistency of sand, or in other cases so that a cream results. Since creams generally require greater quantities of emulsifying agent than do emulsifications containing larger droplets, it is necessary to select the amount of emulsifying agent in accordance with the result sought. However, when 220 parts of water are employed per 100 parts by weight of monomer, a satisfactory amount of emulsifier is from 2 to 20 parts of emulsifier per 100 parts of monomer by weight. The nature of the emulsifying agent, i.e., whether ionic or nonionic appears to have no effect on the quantity of emulsifier utilized. Further, either anionic or cationic emulsifying agents may be employed. Generally, best results are obtained by employing a mixture of anionic emulsifier with nonionic emulsifier. However, the rate of polymerization and yield of polymer is dependent to some degree upon the type and amount of emulsifying agent employed. Nonionic emulsifying agents and mixtures of nonionic emulsifying agents with anionic emulsifying agents generally produce the best yields.

As in other polymerization, the presence of oxidizing atmosphere has an adverse influence on the yield of polymer and the properties of the polymer, such as molecular weight. Thus, it is preferred to carry out polymerization in accordance herewith by also excluding air from the reaction system. This may be accomplished most readily by displacing air from the apparatus used in carrying out the polymerization by an atmosphere of nitrogen.

Substances foreign to the polymerization are generally not desirable in either the organic medium or the aqueous medium. However, many substances may be present without harmful effect, viz, certain salts may be added to alter the density of the aqueous layer to facilitate subsequent separation of layers providing they are otherwise inert. Sodium hydroxide or other alkaline material is sometimes desirable to prevent hydrolysis of the emulsifying agent. Also inert solvent may be incorporated in either layer. Thus, for certain purposes substances may be added which do not contribute to the polymerizaton per se provided that these be inert.

The invention described herein may be better understood by reference to the following examples. It is not intended, however, that the invention be construed as limited thereby.

EXAMPLE I

A standard polymerization bottle was equipped with means for introducing solutions and an inert gas to provide an atmosphere free from oxygen and to permit introduction of the various components. Samples could also be withdrawn at intervals as required.

An aqueous solution of 220 grams of water and 1.2 grams of dissolved sodium 3-diethylaminobenzensulfonate was introduced into the pressure apparatus. Various wetting agents were also dissolved in the aqueous solution in amounts as indicated in Table I. The unsaturated material, 100 grams of styrene containing 0.47 gram of dissolved diisopropyl peroxydicarbonate, was cooled to 0° C. separately, while the apparatus was flushed with nitrogen to remove air. After flushing the bottle the contents were cooled to 5° C. and the cooled unsaturated material containing peroxydicarbonate was introduced. Agitation was provided by tumbling the pressure bottle in a thermostat at 5° C. for two hours, following which time a sample was withdrawn; after which tumbling was continued while withdrawing samples until tests by iodiometric titration indicated the absence of peroxydicarbonate. Table I indicates the emulsifying agent employed and the yield of polymer obtained.

TABLE I

| Emulsifying Agent | | Wt. Percent Yield, Polymer | |
|---|---|---|---|
| Identity | Amount, grams | 120 min. | Terminal [1] |
| Sodium lauryl sulfate | 5.0 | 8 | 29 |
| Do | [2] 10.0 | 60 | 62 |
| Nonylphenoxypoly(ethyleneoxy) ethanol | 10.0 | 24 | 74 |

[1] Yield of polymer in percent of monomer by weight of non-volatile material after complete consumption of peroxydicarbonate indicated by iodiometric titration.
[2] Alkalinity was provided by the addition of 0.55 gram of sodium hydroxide.

The following peroxydicarbonates may be substituted in equimolar amounts for diisopropyl peroxydicarbonate in Example I to obtain approximately equivalent results:

Diisobutyl peroxydicarbonate
Di-n-butyl peroxydicarbonate
Di-n-propyl peroxydicarbonate
Di(2-nitro-2-methylpropyl) peroxydicarbonate [1]
Dibenzyl peroxydicarbonate [1]
Di(2-chloroethyl) peroxydicarbonate [1]

[1] Di(2-nitro-2-methylpropyl) peroxydicarbonate, dibenzyl peroxydicarbonate, and di(2-chloroethyl) peroxydicarbonate given approximately one-fourth as much conversion as the other peroxydicarbonates listed, in the same period of time.

In lieu of sodium 3-diethylaminobenzenesulfonate in Example I, other redox agents may be employed in equivalent amounts at 5 to 10° C. to result in polymers as follows:

Sodium 2-diethylaminobenzenesulfonate
Sodium 3-dimethylaminobenzenesulfonate
Sodium 4-diethylaminobenzenesulfonate
Barium 3-diethylaminobenzenesulfonate
Potassium 3-diethylaminobenzenesulfonate
Sodium 4'-diethylaminophenyl-4-benzenesulfonate
Sodium 4'-diethylaminophenoxy-4-benzenesulfonate
Sodium 4-dimethylaminophenylmethanesulfonate Other unsaturated materials which may be polymerized by the procedure of Example I are:

Vinyl chloride
Vinylidene chloride
Divinyl benzene
Butadiene
Acrylonitrile
Methacrylonitrile
Methyl acrylate
Ethyl acrylate
Bis-allyl carbonate of diethylene glycol Unsaturated materials which may be used in a mixture of comonomers for polymerization by the procedure of Example I are:

50 percent by weight, styrene
50 percent by weight, acrylonitrile 30 percent by weight, acrylonitrile
30 percent by weight, butadiene
40 percent by weight, styrene 40 percent by weight, styrene
60 percent by weight, vinylidene chloride 50 percent by weight, styrene
50 percent by weight, methyl methacrylate 70 percent by weight, vinyl acetate
30 percent by weight, vinylidene chloride

EXAMPLE II

In the procedure of Example I, 0.53 gram of benzoyl peroxide was substituted for diisopropyl peroxydicarbonate and the sodium 3-diethylaminobenzenesulfonate was increased to 3.3 grams and the polymerization was conducted using 5 grams of sodium lauryl sulfate emulsifying agent. Table II indicates inferior yields were obtained with benzoyl peroxide under conditions employed in Example I.

TABLE II

| Sample time, hours: | Wt. percent yield |
|---|---|
| 1 | 15 |
| 2 | 21 |
| 6 | 40 |
| Terminal [1] | 54 |

[1] Yield of polymer in percent of monomer by weight nonvolatile material after complete consumption of benzoyl peroxide.

Although the invention has been described herein according to a preferred embodiment which utilizes heterogeneous media for polymerization, it is also applicable to polymerizations conducted in homogeneous media. Such an embodiment comprises placing in solution an olefinically unsaturated substance and a dialkyl peroxydicarbonate. A suitable solvent for such a purpose could be selected from the class of compounds which includes saturated esters, such as ethyl acetate. To such a solution a second solution miscible with the first solution may be added, which second solution contains the selected redox agent, by way of illustration, sodium 4-dimethylaminophenylsulfonate dissolved in a dimethyl ether of ethylene glycol. The mixture of solutions is then agitated at a constant temperature, such as 0° C. until a test sample shows complete consumption of peroxydicarbonate catalyst, following which the resulting polymer may be isolated by conventional methods such as evaporation of the solvent. Because of the difficulty of selecting solvent systems in which all components of the reaction are soluble, it is preferred that the invention be practiced in heterogeneous medium.

There have been set forth hereinbefore the various groups of redox compounds which are useful in practicing the invention. Many compounds having the proper elements of structure may be selected without departing from the spirit of the invention. It is not intended that the invention be limited to the previously disclosed types of compounds since one skilled in the art can readily conceive of variations which contain tertiaryamino groups and aromatic substituted sulfonic acid groups that are not typified hereinbefore. Without intending to limit the scope of such compounds the following specific examples of compounds which may be utilized are recited:

Sodium 4-dimethylaminobenzenesulfonate
Sodium 3-dimethylaminobenzenesulfonate
Calcium 3-dimethylaminobenzenesulfonate
Barium 3-dimethylaminobenzenesulfonate
Potassium 2-dimethylaminobenzenesulfonate
Potassium 3-methylethylaminobenzenesulfonate
Sodium 4-diethylaminobenzenesulfonate
Sodium 4-dipropylaminobenzenesulfonate
Sodium 4-dibutylaminobenzenesulfonate
Potassium 3-methylisobutylaminobenzenesulfonate
Potassium 4-dilaurylaminobenzenesulfonate
Potassium 4-methyloctadecylaminobenzenesulfonate
Potassium 2-methyl-4-dimethylaminobenzenesulfonate
Potassium 3-chloro-5-dimethylaminobenzenesulfonate
Sodium 2,6-dichloro-4-dimethylaminobenzenesulfonate
Sodium 2-methoxy-4-dipropylaminobenzenesulfonate
Sodium 8-diethylamino-1-napthalenesulfonate
Sodium 4'-dimethylamino-4-biphenylsulfonate
Sodium 2'-dimethylamino-4-biphenylsulfonate
Sodium 4'-diethylamino-4-biphenylsulfonate
Sodium 3'-diethylamino-4-biphenylsulfonate
Sodium 4'-diisopropylamino-4-biphenylsulfoniate
Sodium 4'-dibutylamino-4-biphenylsulfonate
Sodium 4'-dilaurylamino-4-biphenylsulfonate
Sodium 4'-dimethylamino-2-biphenylsulfonate
Sodium 4'-dimethylaminoazobenzene-4-sulfonate
Barium 4'-dimethylaminoazobenzene-4-sulfonate α - (4' - dimethylaminophenyl) - α - (4 - sulfophenyl)-ethane sodium salt
α - (4' - dimethylaminophenyl) - α - (4 - sulfophenyl)-propane sodium salt
α - (4' - dimethylaminophenyl) - α - (4 - sulfophenyl)-toluene sodium salt
Cyclohexyl - (4 - dimethylaminophenyl) - 4' - (sulfophenyl)methane sodium salt
α - (4 - dimethylphenoxy) - β - (sulfophenoxy)ethane sodium salt
Sodium 4-dimethylaminobenzylidene aniline-4'-sulfonate
Sodium 4-benzylidenesulfonate-4'-dimethylaminoaniline
Sodium 4-(4'-diisopropylaminobenzyl)-sulfonate
α - (4' - diisopropylaminophenyl) - β - (4 - sulfophenyl)-ethane sodium salt
Sodium 4 - (4' - dimethylaminophenoxy) - benzenesulfonate While the invention has been described with reference to the details of certain specific embodiments, it is not intended that the invention be limited thereto except insofar as may appear in the following claims.

I claim:
1. A method of polymerizing ethylenically unsaturated compounds susceptible to free-radical polymerization, which comprises polymerizing such unsaturated compound with a catalytic amount of
  (a) a peroxydicarbonate ester represented by the formula:

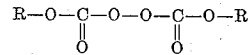

wherein R and $R_1$ are organic radicals of an alcoholic moiety containing up to 18 carbon atoms, and
  (b) a salt of a sulfonic acid represented by the formula:

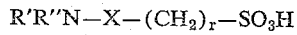

wherein $r$ is a cardinal number of from 0 to 10, R' and R" are aliphatic radicals containing up to 18 carbon atoms and X is a divalent aromatic radical; at temperatures of from −35° C. to 100° C., the weight ratio of said sulfonic acid salt to peroxydicarbonate ester being from 0.5:1 to 250:1.

2. A method according to claim 1 wherein at least two ethylenically unsaturated compounds are polymerized.

3. A method according to claim 1 wherein said peroxydicarbonate ester is diisopropyl peroxydicarbonate.

4. A method according to claim 1 wherein said sulfonic acid salt is an alkali metal dialkylaminobenzene sulfonate, wherein the alkyl portion of said acid salt contains from 1 to 8 carbon atoms.

5. A method according to claim 1 wherein said sulfonic acid salt is sodium diethylaminobenzene sulfonate.

6. A method of polymerizing ethylenically unsaturated compounds susceptible to free-radical polymerization, which comprises bringing to temperatures of from −35° C. to 100° C., a liquid heterogeneous polymerization medium comprising,
  (a) such ethylenically unsaturated compound,
  (b) a catalytic amount of (1) a peroxydicarbonate ester represented by the formula:

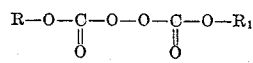

wherein R and $R_1$ are organic radicals of an alcoholic moiety containing up to 18 carbon atoms, and (2) a salt of a sulfonic acid represented by the formula:

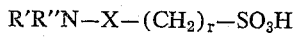

wherein $r$ is a cardinal number of from 0 to 10, R' and R" are aliphatic radicals containing up to 18 carbon atoms, and X is a divalent aromatic radical, the weight ratio of said acid salt to said peroxydicarbonate ester being from 0.5:1 to 250:1, and
  (c) an emulsifying agent.

7. A method according to claim 6 wherein at least two ethylenically unsaturated compounds are polymerized.

8. A method according to claim 6 wherein said sulfonic acid salt is an alkali metal dialkylaminobenzene sulfonate, wherein the alkyl portion of said acid salt contains from 1 to 8 carbon atoms.

9. A method according to claim 6 wherein said peroxydicarbonate ester is diisopropyl peroxydicarbonate.

10. A method according to claim 6 wherein said sulfonic acid salt is sodium diethylaminobenzene sulfonate.

11. A method of polymerizing styrene, which comprises bringing to a temperature of from −20° C. to 30° C. a liquid heterogeneous polymerization medium comprising styrene; from 0.02 to 2.0 weight percent, based on styrene, of diisopropyl peroxydicarbonate; an aqueous solution of emulsifying agent; and from 0.05 to 5.0 parts by weight, per 100 parts of styrene, of an alkali metal salt of a dialkylaminobenzene sulfonic acid, wherein the alkyl portion of said acid contains from 1 to 8 carbon atoms.

12. A catalytic composition consisting essentially of (a) a peroxydicarbonate ester represented by the formula:

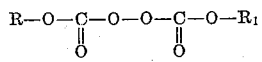

wherein R and $R_1$ are organic radicals of an alcoholic moiety containing up to 18 carbon atoms, and (b) a salt of a sulfonic acid represented by the formula:

$$R'R''N-X-(CH_2)_r-SO_3H$$

wherein $r$ is a cardinal number of from 0 to 10, R' and R'' are aliphatic radicals containing up to 18 carbon atoms, and X is a divalent aromatic radical, the weight ratio of (b) to (a) being from 0.5:1 to 250:1.

13. A composition according to claim 12 wherein said peroxydicarbonate ester is diisopropyl peroxydicarbonate.

14. A composition according to claim 12 wherein said sulfonic acid salt is sodium diethylaminobenzene sulfonate.

15. A composition according to claim 12 wherein said sulfonic acid salt is an alkali metal dialkylaminobenzene sulfonate, wherein the alkyl portion of said acid salt contains from 1 to 8 carbon atoms.

16. A composition according to claim 12 wherein said divalent aromatic radical, as represented by the letter X in said sulfonic acid formula, is selected from the group consisting of:

(a) o,m,p-phenylene
(b) substituted o,m,p-phenylene
(c) 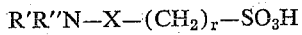
(d) 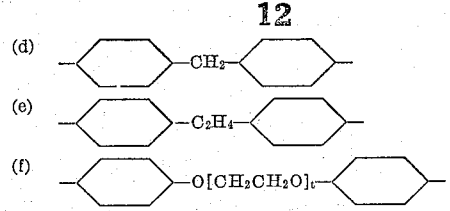
(e)
(f)

wherein $t$ is a cardinal number of from 0 to 2

(g) 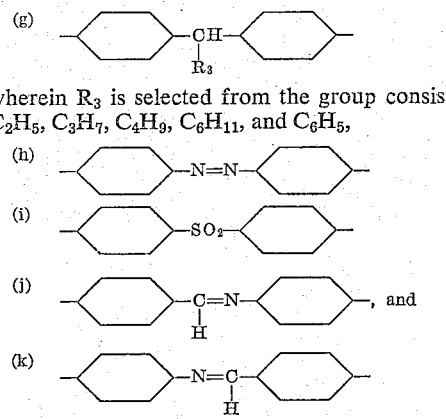

wherein $R_3$ is selected from the group consisting of $CH_3$, $C_2H_5$, $C_3H_7$, $C_4H_9$, $C_6H_{11}$, and $C_6H_5$, (h)
(i)
(j) , and
(k)

17. In a process of polymerizing ethylenically unsaturated compounds susceptible to free-radical polymerization, at temperatures of from −35° C. to 100° C. with catalytic amounts of an organic peroxydicarbonate ester containing up to 18 carbon atoms in each of the terminal ester groups, the improvement which comprises employing a reducing amount of a salt of a sulfonic acid represented by the formula:

$$R'R''N-X-(CH_2)_r-SO_3H$$

wherein $r$ is a cardinal number of from 0 to 10, R' and R'' are aliphatic radicals containing up to 18 carbon atoms and X is a divalent aromatic radical.

18. A process according to claim 17 wherein said peroxydicarbonate ester is diisopropyl peroxydicarbonate.

19. A process according to claim 17 wherein said sulfonic acid salt is sodium diethylaminobenzene sulfonate.

References Cited by the Examiner
UNITED STATES PATENTS

| | | | |
|---|---|---|---|
| 2,464,062 | 3/1949 | Strain. | |
| 2,839,519 | 6/1958 | Seed | 252—426 |
| 2,948,710 | 8/1960 | D'Alelio | 260—93.5 |
| 3,254,033 | 5/1966 | Welch | 252—426 |

JOSEPH L. SCHOFER, *Primary Examiner.*

JAMES A. SEIDLECK, *Assistant Examiner.*